US012654253B2

(12) United States Patent
Liu et al.

(10) Patent No.: US 12,654,253 B2
(45) Date of Patent: Jun. 16, 2026

(54) METHOD FOR FRICTION STIR PROCESSING FOR THE END SURFACE OF AGE-HARDENING ALUMINUM ALLOY PLATES

(71) Applicant: JIMEI UNIVERSITY, Xiamen (CN)

(72) Inventors: Wenhui Liu, Xiamen (CN); Lingji Zhang, Xiamen (CN); Qiuping Yi, Xiamen (CN); Yufeng Song, Xiamen (CN); Hao Huang, Xiamen (CN); Fan Ye, Xiamen (CN); Jianfeng Cao, Xiamen (CN)

(73) Assignee: JIMEI UNIVERSITY, Xiamen City (CN)

( * ) Notice: Subject to any disclaimer, the term of this patent is extended or adjusted under 35 U.S.C. 154(b) by 0 days.

(21) Appl. No.: 19/024,282

(22) Filed: Jan. 16, 2025

(65) Prior Publication Data

US 2025/0153268 A1     May 15, 2025

(30) Foreign Application Priority Data

Jan. 24, 2024    (CN) ......................... 202410100763.7

(51) Int. Cl.
| | |
|---|---|
| *B23K 20/12* | (2006.01) |
| *B23K 103/10* | (2006.01) |
| *B23K 103/14* | (2006.01) |
| *B23K 103/20* | (2006.01) |

(52) U.S. Cl.
CPC ...... *B23K 20/1255* (2013.01); *B23K 2103/10* (2018.08); *B23K 2103/14* (2018.08); *B23K 2103/20* (2018.08)

(58) Field of Classification Search
None
See application file for complete search history.

(56) References Cited

U.S. PATENT DOCUMENTS

| | | | | |
|---|---|---|---|---|
| 7,614,539 | B2 * | 11/2009 | Sankaran | ........... B23K 20/1205 228/112.1 |
| 8,142,579 | B2 * | 3/2012 | Koma | ..................... C22F 1/043 148/698 |

(Continued)

FOREIGN PATENT DOCUMENTS

| | | | |
|---|---|---|---|
| CN | 101439439 A | * | 5/2009 |
| CN | 205324999 U | | 6/2016 |

(Continued)

*Primary Examiner* — Devang R Patel

(57) ABSTRACT

A method for friction stir processing of an end surface of an age-hardening aluminum alloy plate is provided, in which a solid-solution state age-hardening aluminum alloy plate is butt-joined to and clamped with a dissimilar plate to obtain a combined plate; two sides of the combined plate are respectively provided with a weld-start plate and a lead-out plate; a bottom end of a stirring head is provided with a stirring pin; a distance between the outer edge of the stirring pin and the end surface of the age-hardening aluminum alloy plate is maintained to be 0.01-5 mm; the stirring pin is rotated into the weld-start plate; the age-hardening aluminum alloy plate is subjected to friction stir processing underwater or in a liquid nitrogen cooling condition; and the processed age-hardening aluminum alloy plate is separated and subjected to aging treatment.

5 Claims, 3 Drawing Sheets

(56) References Cited

U.S. PATENT DOCUMENTS

| 8,857,695 | B2 * | 10/2014 | Takasugi | C22C 19/03 |
| | | | | 228/2.1 |
| 2019/0240716 | A1 * | 8/2019 | Yuan | B21D 22/205 |
| 2024/0131615 | A1 * | 4/2024 | Wellock | B23K 20/2336 |

FOREIGN PATENT DOCUMENTS

| CN | 107460416 | A | * | 12/2017 | C22F 1/002 |
| CN | 108406084 | A | * | 8/2018 | B23K 20/1255 |
| CN | 108570634 | A | * | 9/2018 | C22F 1/05 |

* cited by examiner

METHOD FOR FRICTION STIR PROCESSING FOR THE END SURFACE OF AGE-HARDENING ALUMINUM ALLOY PLATES

CROSS-REFERENCE TO RELATED APPLICATIONS

This application claims the benefit of priority from Chinese Patent Application No. 202410100763.7, filed on Jan. 24, 2024. The content of the aforementioned application, including any intervening amendments made thereto, is incorporated herein by reference in its entirety.

TECHNICAL FIELD

This application relates to the preparation and processing of aluminum alloy thick plates, particularly concerning a method for friction stir processing for the end surface of age-hardening aluminum alloy plates.

BACKGROUND

With the development of modern warfare, armored vehicles are anticipated to face comprehensive lethal threats in future combat, thereby necessitating enhanced protective performance and survivability of armor materials. 7000-series and 2000-series age-hardening aluminum alloys are characterized by good machinability, light weight, excellent impact resistance, outstanding weldability and good corrosion resistance, and thus they have been widely applied to the fabrication of main bodies of amphibious and airborne armored vehicles. However, due to the inhomogeneous microstructure in the thickness direction of laminated armor aluminum alloy and thick armor aluminum alloy plates, the end faces of the armor aluminum alloy plates are prone to delamination and cracking under the influence of their own power vibration, road impacts and loads. Chinese patent application No. 201520994763.2 discloses a surface welding method to prevent the end surface of the aluminum alloy armor plate from suffering delamination and cracking. Although this method can prevent cracking of thick aluminum alloy plates to some extent, it involves extensive material and labor consumption, and will negatively affect the overall vehicle appearance. Therefore, it is of great importance and practical value to develop a friction stir processing method that improves the interlayer bonding strength and ballistic performance of the end surface of age-hardening aluminum alloy plates.

SUMMARY

An object of the disclosure is to provide a method for friction stir processing of an end surface of an age-hardening aluminum alloy plate to overcome the defects in the prior art. This method can improve the delamination phenomenon of the age-hardening aluminum alloy plate through plastic flow in the thickness direction, enhance the interlayer bonding strength, and effectively prevent delamination and cracking of the end faces of the age-hardening aluminum alloy plate.

Technical solutions of the present disclosure are described as follows.

The present application discloses a method for friction stir processing for the end surface of age-hardening aluminum alloy plates, which includes the following steps:

(1) butt-joining an age-hardening aluminum alloy plate, in a solid-solution state, to a dissimilar plate and then clamp-fixing to form a combined plate; and arranging a weld-start plate at one side and a lead-out plate at the other side of the combined plate;

(2) positioning a stirring pin at the lower end of the stirring head, ensuring a gap of 0.01-5 mm between the outer edge of the stirring pin and the end surface of the age-hardening aluminum alloy plate, and rotating the stirring pin into the weld-start plate;

(3) performing friction stir processing on the age-hardening aluminum alloy plate in an underwater condition or a liquid nitrogen cooling condition; and (4) separating the age-hardening aluminum alloy plate from the weld-start plate, the lead-out plate and the dissimilar plate, and performing aging treatment on the age-hardening aluminum alloy plate.

In some embodiments, in step (1), the age-hardening aluminum alloy plate is a solid-solution quenched age-hardening aluminum alloy plate or a laminated aluminum alloy plate; the dissimilar plate is a high-melting-point steel plate or titanium plate material; a thickness of the dissimilar plate is 0.001-1 mm less than a thickness of the age-hardening aluminum alloy plate; and the weld-start plate and the lead-out plate respectively on both sides of the age-hardening aluminum alloy plate have the same thickness.

In some embodiments, the stirring pin is threaded.

In some embodiments, the stirring head is configured to be tilted toward a direction opposite to a feeding direction of the stirring head at an angle of 1-3° during operation; a plunge depth of the stirring head is greater than or equal to a thickness difference between the age-hardening aluminum alloy plate and the dissimilar plate; and a feeding speed of the stirring head is 50-250 mm/min, and a rotational speed of the stirring head is 500-2500 r/min.

In some embodiments, in step (4), the aging treatment is carried out at 110-190° C. for 8-36 h.

Compared to the prior art, the present disclosure has the following beneficial effects.

(1) Regarding the method provided herein, the plastic flow in the plate thickness direction can improve the delamination phenomenon of the microstructure along the thickness direction and interlayer bonding strength, thereby effectively preventing the end surface of the age-hardening aluminum alloy plate from suffering delamination cracking.

(2) The high-melting-point dissimilar plate provided herein can prevent the end surface deformation of the age-hardening aluminum alloy plate and avoid welding between the age-hardening aluminum alloy plate and the dissimilar plate.

(3) The hardness and ballistic resistance of a stirring zone of the age-hardening aluminum alloy plate are enhanced through friction stir processing and aging treatment.

(4) The method disclosed herein can be applied to other metal plates or metal-laminated composites to enhance the interlayer bonding strength and effectively prevent the delamination cracking of the end surface.

(5) The method disclosed herein is easy to operate, and thus suitable for the industrial processing.

BRIEF DESCRIPTION OF THE DRAWINGS

In order to illustrate the technical solutions in the embodiments of the present disclosure or the prior art more clearly, the accompanying drawings needed in the description of the embodiments or prior art will be briefly described below. Obviously, presented in the accompanying drawings are only some embodiments of the present disclosure, and for those of ordinary skill in the art, other accompanying drawings can be obtained from the structures illustrated in these drawings without making creative effort.

In the figures: 1—age-hardening aluminum alloy plate; 2—stirring zone; 3—lead-out plate; 4—stirring head; 5—dissimilar plate; and 6—weld-start plate.

DETAILED DESCRIPTION OF EMBODIMENTS

Technical solutions in the embodiments of the present disclosure will be described clearly and completely below in conjunction with the accompanying drawings. It is obvious that described below are merely some embodiments of the present disclosure, instead of all embodiments. Based on the embodiments in the present disclosure, all other embodiments obtained by those of ordinary skill in the art without making creative effort shall fall within the scope of the present disclosure defined by the appended claims.

Figure 1:
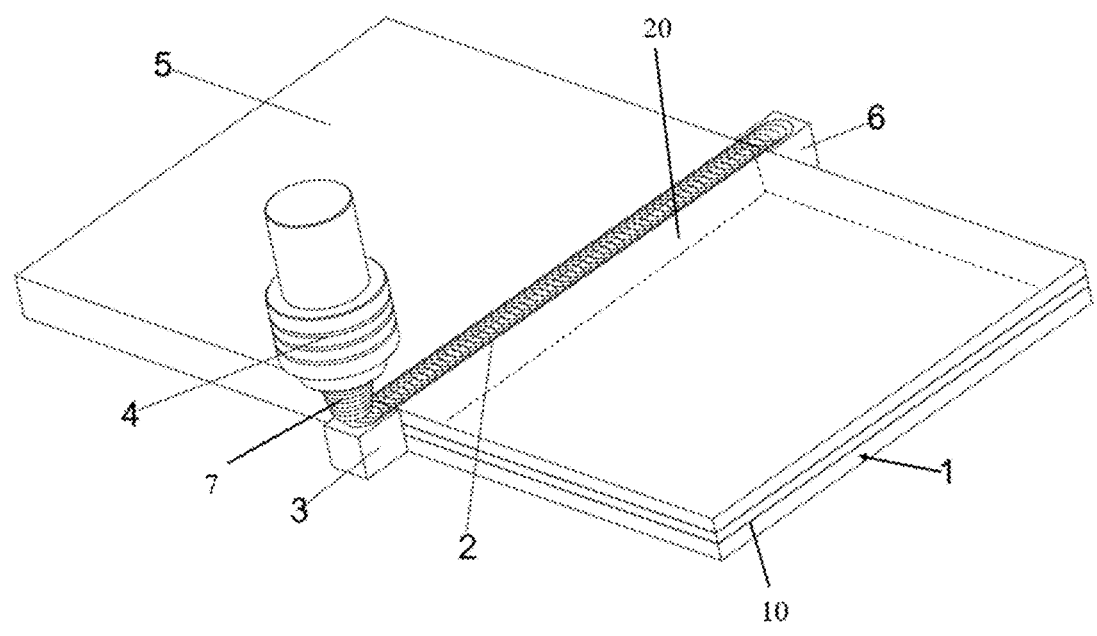
FIG. 1 schematically shows assembly of components in a friction stir processing method according to an embodiment of the present disclosure.

As shown in FIG. 1, the present disclosure provides a method for friction stir processing of an end surface of an age-hardening aluminum alloy plate, which is performed as follows.

(1) An age-hardening aluminum alloy plate 1 in a solid-solution state is butt-joined to and clamped with a dissimilar plate 5 to obtain a combined plate. A weld-start plate 6 is arranged at a first side of the combined plate and a lead-out plate 3 is arranged at a second side of the combined plate.

(2) A stirring pin 7 is arranged at a bottom end of a stirring head 4. The age-hardening aluminum alloy plate has a first end surface 20 and a second surface 10 opposite to the first end surface 20. A distance between the outer edge of the stirring pin 7 and the first end surface 20 of the age-hardening aluminum alloy plate 1 in a direction from the age-hardening aluminum alloy plate 1 to the dissimilar plate 5 is maintained to be 0.01-5 mm. Then, the stirring pin 7 is rotated into the weld-start plate 6.

(3) The age-hardening aluminum alloy plate 1 is subjected to friction stir processing in an underwater condition or a liquid nitrogen cooling condition.

(4) The processed age-hardening aluminum alloy plate 1 is separated from the weld-start plate 6, the lead-out plate 3 and the dissimilar plate 5, and then subjected to aging treatment.

In this embodiment, in step (1), the age-hardening aluminum alloy plate 1 is a solid-solution quenched age-hardening aluminum alloy plate or a laminated aluminum alloy plate. The dissimilar plate 5 is a high-melting-point steel plate or titanium plate material. The high-melting-point dissimilar plate 5 provided herein can prevent the end surface deformation of the age-hardening aluminum alloy plate 1 and avoid welding between the age-hardening aluminum alloy plate 1 and the dissimilar plate 5. A thickness of the dissimilar plate 5 is 0.001-1 mm less than a thickness of the age-hardening aluminum alloy plate 1. The plastic flow in the plate thickness direction can improve the delamination phenomenon of the microstructure along the thickness direction and interlayer bonding strength, thereby effectively preventing the end surface of the age-hardening aluminum alloy plate 1 from suffering delamination cracking. Two opposite sides of the age-hardening aluminum alloy plate 1 are respectively provided with the weld-start plate 6 and the lead-out plate 3, and the lead-out plate 3 has the same thickness as the weld-start plate 6.

In this embodiment, the stirring pin is threaded. The stirring pin is preferably cylindrical, which is beneficial for the plastic flow of materials along the thickness direction.

In this embodiment, the stirring head 4 is configured to be tilted backward at an angle of 1-3° during operation, preferably 2°. A plunge depth of the stirring head 4 is greater than or equal to a thickness difference between the age-hardening aluminum alloy plate 1 and the dissimilar plate 5. A feeding speed of the stirring head 4 is 50-250 mm/min, preferably 100-180 mm/min, and a rotational speed of the stirring head 4 is 500-2500 r/min, preferably 1000-2000 r/min. The hardness and ballistic resistance of a stirring zone of the age-hardening aluminum alloy plate 1 are enhanced through continuous stirring of the stirring head 4.

In this embodiment, in step (4), the aging treatment is carried out at 110-190° C. for 8-36 h.

Example 1

Step (1) A laminated aluminum alloy plate (consisting of a 7A52 layer with a thickness of 2.5 mm, a pure aluminum layer with a thickness of 0.15 mm and a 7N01 layer with a thickness of 16.5 mm) is subjected to solution treatment at 470° C. for 2 h, quenched with water at room temperature, and then butt-joined to and clamped with a titanium plate with a thickness of 19 mm. Then, two sides of the laminated aluminum alloy plate are respectively provided with a weld-start plate and a lead-out plate with a thickness of 19.15 mm.

Step (2) A distance between the outer edge of the stirring pin and the end surface of the laminated aluminum alloy plate is maintained to be 0.3 mm, and a cylindrical threaded stirring pin is rotated into the weld-start plate.

Step (3) The laminated aluminum alloy plate is subjected to liquid-nitrogen-cooling friction stir processing, where the stirring head has a rotational speed of 1500 r/min, a plunge depth of 0.15 mm and a tilt angle of 2.5°, and a feed speed is set to 100 mm/min.

Step (4) The laminated aluminum alloy plate is separated from the weld-start plate, the lead-out plate and the titanium plate, and then subjected to aging treatment at 120° C. for 24 h.

Comparative Example 1

A laminated aluminum alloy plate (consisting of a 7A52 layer with a thickness of 2.5 mm, a pure aluminum layer with a thickness of 0.15 mm and a 7N01 layer with a thickness of 16.5 mm) is subjected to solution treatment at 470° C. for 2 h, water quenching at room temperature, and aging treatment at 120° C. for 24 h.

Example 2

Step (1) A laminated aluminum alloy plate (consisting of a 2195 layer with a thickness of 8 mm, a pure aluminum layer with a thickness of 0.05 mm and a 2519 layer with a thickness of 8 mm) is subjected to solution treatment at 530° C. for 2 h, quenched with water at room temperature, and then butt-joined to and clamped with a titanium plate with a thickness of 16 mm. Then, two sides of the laminated aluminum alloy plate are respectively provided with a weld-start plate and a lead-out plate with a thickness of 16.05 mm.

Step (2) A distance between the outer edge of the stirring pin and the end surface of the laminated aluminum alloy plate is maintained to be 0.2 mm, and a cylindrical threaded stirring pin is rotated into the weld-start plate.

Step (3) The laminated aluminum alloy plate is subjected to liquid-nitrogen-cooling friction stir processing, where the stirring head has a rotational speed of 1750 r/min, a plunge depth of 0.05 mm and a tilt angle of 2.5°, and a feed speed is set to 100 mm/min.

Step (4) The laminated aluminum alloy plate is separated from the weld-start plate, the lead-out plate and the titanium plate, and then subjected to aging treatment at 165° C. for 12 h.

Comparative Example 2

A laminated aluminum alloy plate (consisting of a 2195 layer with a thickness of 8 mm, a pure aluminum layer with a thickness of 0.05 mm and a 2519 layer with a thickness of 8 mm) is subjected to solution treatment at 530° C. for 2 h, water quenching at room temperature, and aging treatment at 165° C. for 12 h.

Figure 2:
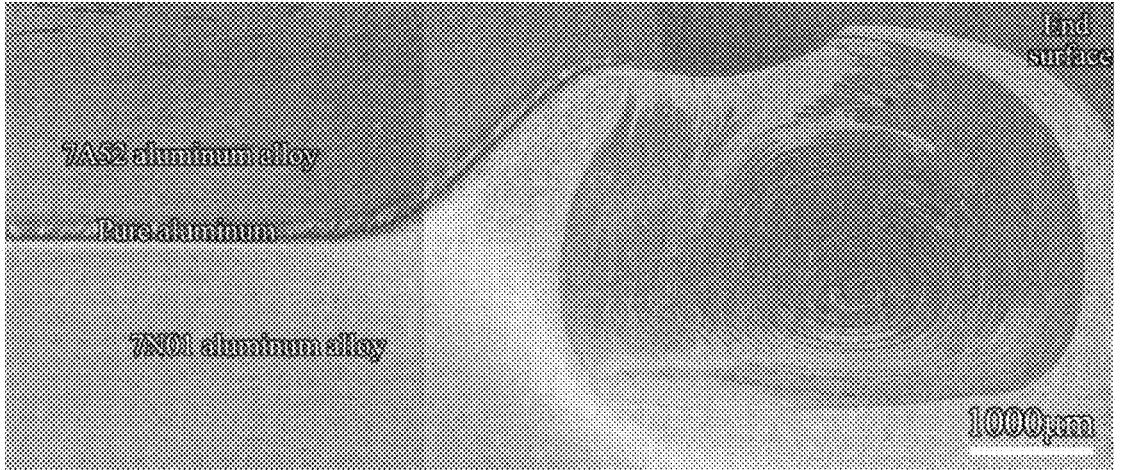
FIG. 2 is a microstructure image of a laminated aluminum alloy prepared in Example 1 of the present disclosure.

FIG. 2 is a microstructural diagram of a laminated aluminum alloy prepared in Example 1. As can be seen from FIG. 2, the end surface of the laminated aluminum alloy is flat and has not been welded to the titanium plate. At the same time, friction stir processing fractures the interlayer structure of the laminated aluminum alloy. The plastic flow of the material at the vertical interface caused by friction stir creates an effective structural interlocking zone, thus constructing a three-dimensional spatial structure composed of stirring and interlocking zones, so as to overcome the limitation of planar interfaces in traditional laminated aluminum alloy materials.

Figure 3:
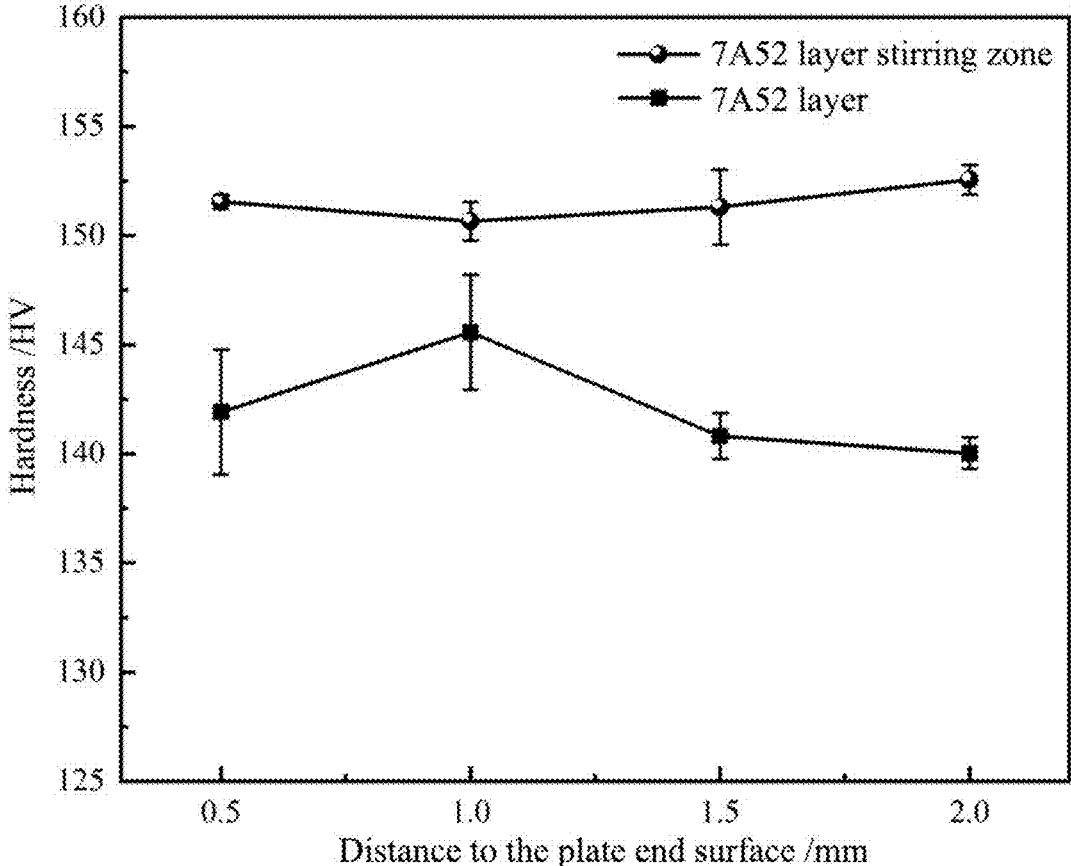
FIG. 3 is a hardness distribution diagram of 7A52 aluminum alloy samples prepared in Example 1 and Comparative Example 1.

FIG. 3 is a hardness distribution diagram of 7A52 aluminum alloy samples prepared in Example 1 and Comparative Example 1. As can be seen from FIG. 3, after the treatment of the method provided herein, the hardness of the stirring zone 2 is significantly higher than that of the 7A52 aluminum alloy without stir processing. A tensile-shear test is conducted to evaluate the interlayer shear strength of the laminated aluminum alloy. The local interlayer shear strengths of the 7A52/pure aluminum/7N01 laminated aluminum alloy prepared in Comparative Example 1 (untreated by the method provided herein) and Example 1 (treated by the method provided herein) are 85.6 MPa and 185.2 MPa, respectively. The local interlayer shear strengths of the 2195/pure aluminum/2519 laminated aluminum alloy prepared in Comparative Example 2 (untreated by the method provided herein) and Example 2 (treated by the method provided herein) are 87.1 MPa and 180.5 MPa, respectively.

The embodiments of the present disclosure are presented in a progressive manner, with each embodiment focusing on the differences from other embodiments. The common or similar parts between the embodiments are referred to as appropriate. The devices disclosed herein correspond to the methods provided herein, and their descriptions are relatively simple. Relevant details can be referred to in the method provided herein.

The description of the embodiments disclosed herein is provided to enable those skilled in the art to implement or utilize the present disclosure. Though the disclosure has been described in detail above, those skilled in the art can still make various modifications, changes and replacements to the technical solutions recited in the embodiments. It should be understood that those modifications, changes and replacements made without departing from the spirit of the disclosure shall fall within the scope of the disclosure defined by the appended claims.

What is claimed is:

1. A method for friction stir processing of an end surface of an age-hardening aluminum alloy plate, comprising:
   (1) butt-joining an age-hardening aluminum alloy plate after being subjected to solution treatment onto a dissimilar plate; clamping and fixing the age-hardening aluminum alloy plate and the dissimilar plate to obtain a combined plate; and arranging a weld-start plate at a first side of the combined plate and a lead-out plate at a second side of the combined plate; wherein the age-hardening aluminum alloy plate has a first end surface and a second end surface opposite to the first end surface;
   (2) arranging a stirring pin at a bottom end of a stirring head, maintaining a distance between an outer edge of the stirring pin and the first end surface of the age-hardening aluminum alloy plate to be 0.01-5 mm in a direction from the age-hardening aluminum alloy plate to the dissimilar plate, and rotating the stirring pin into the weld-start plate;
   (3) performing friction stir processing on the age-hardening aluminum alloy plate in an underwater condition or a liquid nitrogen cooling condition, wherein the first end surface is in direct contact with and abuts against the dissimilar plate in steps (1)-(3); and
   (4) separating the age-hardening aluminum alloy plate from the weld-start plate, the lead-out plate and the dissimilar plate, and performing aging treatment on the age-hardening aluminum alloy plate.

2. The method of claim 1, wherein in step (1), the age-hardening aluminum alloy plate is a solid-solution quenched age-hardening aluminum alloy plate or a laminated aluminum alloy plate; the dissimilar plate is a steel plate or titanium plate material; a thickness of the dissimilar plate is 0.001-1 mm less than a thickness of the age-hardening aluminum alloy plate; the weld-start plate and the lead-out plate respectively on both sides of the age-hardening aluminum alloy plate have the same thickness.

3. The method of claim 1, wherein the stirring pin is threaded.

4. The method of claim 2, wherein the stirring head is configured to be tilted toward a direction opposite to a feeding direction of the stirring head at an angle of 1-3° during operation; and a feeding speed of the stirring head is 50-250 mm/min, and a rotational speed of the stirring head is 500-2500 r/min.

5. The method of claim 1, wherein in step (4), the aging treatment is carried out at 110-190° C. for 8-36 h.

* * * * *